(12) United States Patent
Suhr

(10) Patent No.: US 6,854,976 B1
(45) Date of Patent: Feb. 15, 2005

(54) BREAST MODEL TEACHING AID AND METHOD

(76) Inventor: John S. Suhr, 2010 46th Ave., Greeley, CO (US) 80634

( * ) Notice: Subject to any disclaimer, the term of this patent is extended or adjusted under 35 U.S.C. 154(b) by 0 days.

(21) Appl. No.: 10/696,604

(22) Filed: Oct. 29, 2003

Related U.S. Application Data

(60) Provisional application No. 60/423,270, filed on Nov. 2, 2002.

(51) Int. Cl.$^7$ .............................................. G09B 23/28
(52) U.S. Cl. ....................................... 434/273; 434/275
(58) Field of Search ................................ 434/262, 267, 434/272, 273

(56) References Cited

U.S. PATENT DOCUMENTS

| | | | |
|---|---|---|---|
| 4,001,951 A | * | 1/1977 | Fasse ........................ 434/267 |
| 4,134,218 A | * | 1/1979 | Adams et al. ............... 434/267 |
| 4,867,686 A | * | 9/1989 | Goldstein ................... 434/267 |
| 5,273,435 A | * | 12/1993 | Jacobson .................... 434/267 |
| 6,575,757 B1 | * | 6/2003 | Leight et al. ................ 434/273 |

* cited by examiner

*Primary Examiner*—Kurt Fernstrom
(74) *Attorney, Agent, or Firm*—Rick Martin; Patent Law Offices of Rich Martin, PC

(57) ABSTRACT

Medical personnel and lay persons are provided with a training aid to practice finding a cancerous lump in a human breast. A spherical ball is sized to simulate a cancerous lump. The ball is glued to the plunger of a microswitch. The microswitch is encased in a silicone insert which is molded inside a life like model of a human breast. When the ball is pushed down against the plunger, an alarm device such as light is activated.

14 Claims, 6 Drawing Sheets

BREAST MODEL TEACHING AID AND METHOD

CROSS REFERENCE APPLICATIONS

This application is a non-provisional application claiming the benefits of provisional application No. 60/423,270 filed Nov. 2, 2002.

FIELD OF INVENTION

The present invention relates to a breast cancer lump detection simulator and training aid.

BACKGROUND OF THE INVENTION

Fast growing breast cancers can double in size every three days. It can take as little as three months for a single breast cancer cell to double 30 times and produce a one centimeter size cancerous tumor. Therefore, a breast cancer can grow to a four centimeter diameter (stage III to stage IV) in a nine month period, between annual clinical exams. About one in eight women in the United States will develop breast cancer in their life.

A need exists to disseminate to women and medical practitioners worldwide a method to detect with one's hands a small lump in the breast.

The present invention provides a life size model of a human breast with a chosen sized lump imbedded in it. The student must push down on the lump in a proper direction, as taught by medical professionals, in order to trigger an electronic alarm.

SUMMARY OF THE INVENTION

The main aspect of the present invention is to provide a life like training model of a human breast with a hidden lump tied to a microswitch, thereby enabling a student to probe for the lump in a medically proficient manner.

Another aspect of the present invention is to provide a variety of models including a small lump, a large lump, no lump, and two models with various combinations of lumps.

Other aspects of this invention will appear from the following description and appended claims, reference being made to the accompanying drawings forming a part of this specification wherein like reference characters designate corresponding parts in the several views.

At least two breast self exam (BSE) techniques may be used on the models. First, the Pat and Rub technique uses the three middle fingers applying pressure and patting and rubbing in a circular motion completely around the breast from the stem (outer breast) to the nipple. Second, the Spoke Wheel Method uses the three middle fingers with the fingers placed in a straight line from the stem to the nipple. Fingers are moved until the entire breast has been felt. When the individual finds a lump and the technique is done correctly, a light will come on to indicate the technique has been performed correctly.

Finding a lump and being reinforced when the light goes on provides motivation to use the model and enables showing others how to practice BSE's with the model. Using the model might provide intrinsic reinforcement (e.g. internal good feelings). When a lump is found and the light goes on, an individual feels successful. The model and the training techniques that can be developed around it may serve to lessen anxiety, and they may provide reinforcement, motivation and teach BSE techniques for early detection of breast cancer.

Symptoms of Breast Cancer

The most important physical symptom of breast cancer is a painless mass or lump. Up to 10% of patients have breast pain and no mass. Less common symptoms include persistent changes to the breast (thickening, swelling, skin irritation or distortion) and nipple symptoms (spontaneous discharge, erosion, inversion, or tenderness). Early breast cancer, when it is most treatable, usually does not produce any symptoms. It is therefore, very important for women to follow recommended guidelines to find breast cancer before symptoms develop (mammography, clinical breast examination (CBE), and breast self examination (BSE)). Because a small percentage of cancers may be missed by mammography, it is important for women aged 40 and older, to also perform a monthly BSE and have an annual CBE.

Breast Self-Examination (BSE)

A woman performs a BSE in the same way that a health care professional performs a clinical examination. Using the pads of the fingers gently feel the breasts, giving special attention to their shape and texture, location of any lumps, and whether such lumps are attached to the skin or to deeper tissues. A woman should do a BSE monthly to become familiar with both the appearance and feel of her breasts so she is aware of any change. Lumps are not necessarily abnormal, they come and go with a woman's menstrual cycle. When lumps are detected and tested, the majority are found to be noncancerous.

According to the World Organization of Family Practitioners, 9 out of 10 breast cancers are discovered by women themselves. Several different breast self-exam techniques are available. However, none of these deals directly with the emotional aspects of performing breast self-exams. Many women could be frightened away from performing breast self-exams if they have inadequate education related to the breasts, and lack knowledge of normal hormonal fluctuations and sensations such as pain, swelling and tenderness. The female breast and its underlying structure are complex to evaluate for changes. For example, a lump may be found with a woman in one position and concealed when she changes positions. A woman is given the responsibility of screening for breast cancer and sometimes not given adequate tools to provide an accurate screening.

If women and their health care professionals are provided with an educational tool, especially the present invention, instructed in the signs and symptoms of breast cancer, early diagnosis of breast cancer could be facilitated. The model teaching aid will help women, health professions, and educators learn more about breast cancer self-exams and early detection of breast cancer.

Development of the Check-it Model Teaching Aid

The model could be used for reinforcement of breast self-exam. (BSE) A model may be made of silicone, oil and a catalyst poured into a mold. An uncured silicone mixed with oil gives a more lifelike texture. A catalyst may be added to cure the silicone. A small amount of silicone may be set aside, and a darker colored catalyst may be added. The darker silicone mixture may be poured carefully into the mold area of the nipple to simulate the areola. The silicone may then be allowed to set. Then the rest of the silicone may be poured slowly in a circular manner into the mold.

A switch with a wooden bead attached (to simulate a lump) may be placed in the silicone substance. The switch may be either free flowing or attached by a plastic strip, which are two examples. The switch may have two wires attached. One wire may go to the light and the other to an energy source (battery). The switch could be one of three submini lever switches, roller lever switch or momentary push button switch, as but a few examples. Each switch might have its own use in different positions and allow for different functions. A light, blue LED, e.g. might be illuminated when pressure is applied to the switch (completes a circuit).

The light could be replaced with a vibrator that could be placed in the silicone and produce vibrations or waves throughout the silicone at the appropriate time. The light could also be replaced with a buzzer or a lever that makes a clicking sound that would make noise when pressure is applied to the switch and the circuit is completed. The switch could be attached to a tape recorder that would tell you that you found a lump in the breast and if other lumps are to be found. Different types of sensory devices could be placed in the model before pouring silicone, so that they would be next to the surface, and different amounts of pressure would light different colored lights. To show the amount of pressure needed to detect a lump, a tape recording could also be used that would tell you if more or less pressure is needed.

Sensory switches could be placed in areas that have high incidence of cancer or lower incidences. The light or a recorded voice could tell if you were in the correct place or not. This will allow for more effective detection, not only for the model, but to carry into testing of self-awareness. The silicone could be different colors to represent areas of the breast that are the most common places cancer is found. The silicone could be colorless to allow the internal parts of the breast model to be seen as well as locations of lumps. Each internal part of the breast could be a different color with muscles at the back of the breast poured at different times as well as in different directions allowing for realization. The top half of the breast model could be clear silicone. The bottom half could be colored to give an idea of the location of the internal parts in relation to the outside of the breast.

Silicone could be of different grades and cured at different temperatures or with different catalyst added to change the texture of the silicone. Perhaps each internal part would need to have a separate mold. Then the parts could be placed inside the breast model with clear silicone poured into the mold to fill and keep the internal parts in place. The internal parts might not need to be made of silicone, but other materials could suffice as well.

Different sizes of breasts for different stages of life (ages) as well as shapes could be made. Lumps of silicone might be added to show swelling in different areas of the breast. The lumps could be placed next to the outside of the mold. Then a layer of silicone poured over the lump could simulate what a lump might look or feel like.

Silicone, acting as the outer skin, could have color to look like skin cancer, red with black or a dark center, irregular edges (pinpoint, "zit-like"). The mold itself may need to be made differently. It may need to have the pigment added to some areas before other silicone is poured. The nipple may have to be hollowed out so that it could be inverted and extended as a normal nipple would be. A latex product inside the silicone nipple could allow flexibility and the nipple to be inverted and extended a number of times so that it wouldn't wear out prematurely.

The nipple could have micro holes put into it to allow a fluid to escape with a light squeeze and or palpitation of the nipple and areola. A sack of fluid could be placed behind the nipple. An extended sack with a duct that would lead to the nipple so that with pressure, a small amount of fluid would be produced at the end of the nipple, might also be provided. The fluid could be a white, cloudy substance. This could be replenished with a needle and syringe. The sack could be self-sealing with a back flow preventor to the nipple so fluid would flow in only one direction.

When cancer is in an advanced stage, the body may give off an odor. This might be reproduced by a sack into the back of the breast that can be refilled by a needle and syringe. The system would be a self-sealing sack and the odor would be emitted with palpitation of the swollen area. This method would give reinforcement on how to check and what to check for in the breast.

Lymph nodes typically enlarge when a woman has breast cancer. Lymph nodes are different from breast cancer tumor. The lymphatic system forms lumps that are not as dense or fluid as a fibrous cyst. In the model, lymph nodes would be placed into the muscle level of the breast, pectoralis major and minor, at approximately the location where they would normally be found. Apical lymph nodes, central lymph nodes, anterior axillary or pectoral lymph nodes and internal thoracic lymph nodes may be placed at each site. Two normal nodes and two enlarged nodes could be placed in a breast model. The normal node could be attached to one colored light while the enlarged node could be attached to a different colored light so that a comparison could be made. The lymph nodes also typically change in size and density with age.

Along with the model, a CD or VHS tape describing the procedure of breast self-examination could be included. An individual could practice breast self-exam along with the tape or video, using, e.g., the pat and rub or the spoke method.

As can be easily understood from the foregoing, the basic concepts of the present invention may be embodied in a variety of ways. It involves both training techniques as well as devices to accomplish the appropriate training. In this application, the training techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
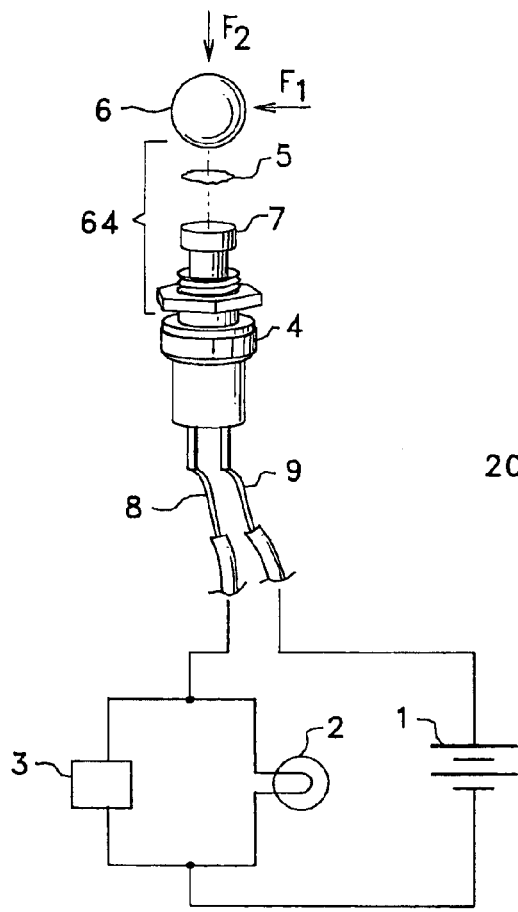
FIG. 1 is a side perspective view of a preferred microswitch with its circuit schematic.

Referring first to FIG. 1 a schematic shows a power supply, preferably a battery 1 connected in series with a bulb 2 and a switch 4. The bulb 2 is connected in parallel with an optional teaching device, preferably a stored message device with a speaker, such as a tape recorder 3. The momentary pushbutton switch 4 could be a Radioshack® SPST miniswitch, part no. 275-1547. It could also be a variable rheostat switch that increases the current flow the further the action end is depressed. A dab of glue 5 holds a simulated lump 6 to the action end 7 of the switch 4. Clearly a sideways force $F_1$ will not activate the switch 4, whereas a downward force $F_2$ will activate the switch 4. The simulated lump 6 could be a wooden sphere selected at a size to approximate a cancerous lump.

The essence of the present invention is to suspend this switch arrangement or an equivalent thereof in a soft, pliable model of a human breast. A student can use medically defined probing methods to locate the simulated lump 6 and move the action end 7 to light the bulb 2. A variety of equivalents exist for the bulb 2 including noise makers and vibration alarms.

Figure 2:
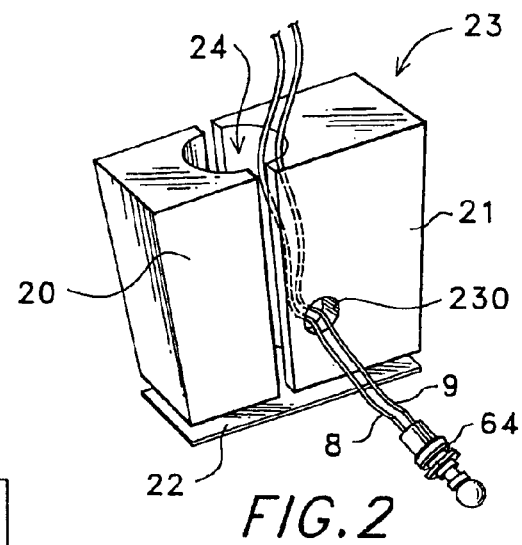
FIG. 2 is a top perspective view of a mold for forming a silicone implant having the microswitch.
Figure 3:
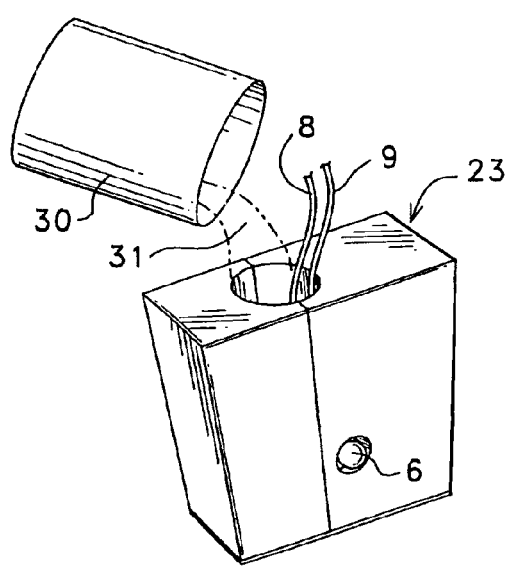
FIG. 3 is a top perspective view showing the silicone pouring into the mold shown in FIG. 2.
Figure 4:
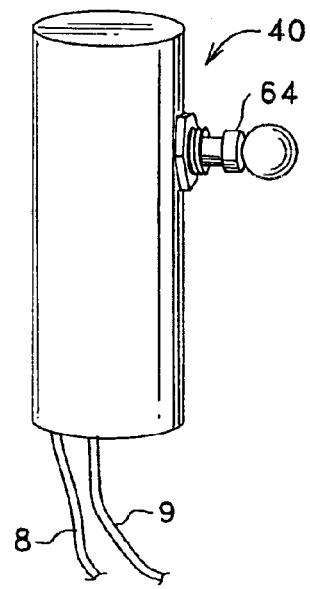
FIG. 4 is a side perspective view of the finished silicone lump implant ready for placement into the human breast model.

Referring next to FIGS. 2,3,4 the preferred method to encapsulate the switch/lump assembly 64 is shown. A mold 23 consists of a bottom 22 and halves 20, 21. A hole 230 allows the assembly 64 to protrude therethrough. Wires 8,9 are threaded through the hole 230 up and out cavity 24 before a silicone or like substance 31 is poured in via container 30.

Figure 12:
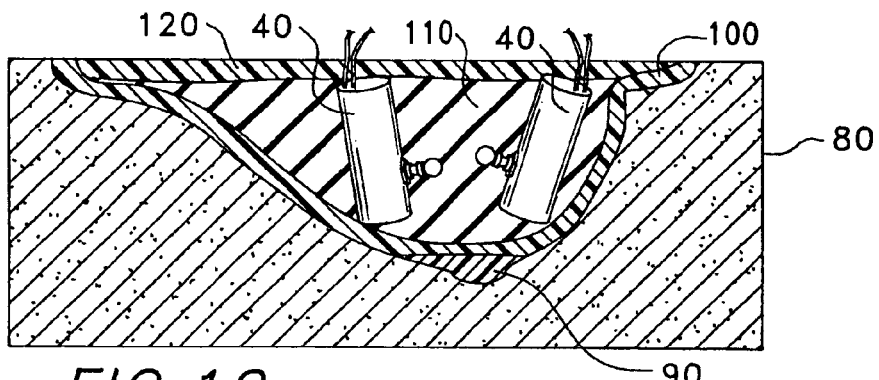
FIG. 12 is the same view as FIG. 11 showing the final pouring of the latex back of the model.
Figure 13:
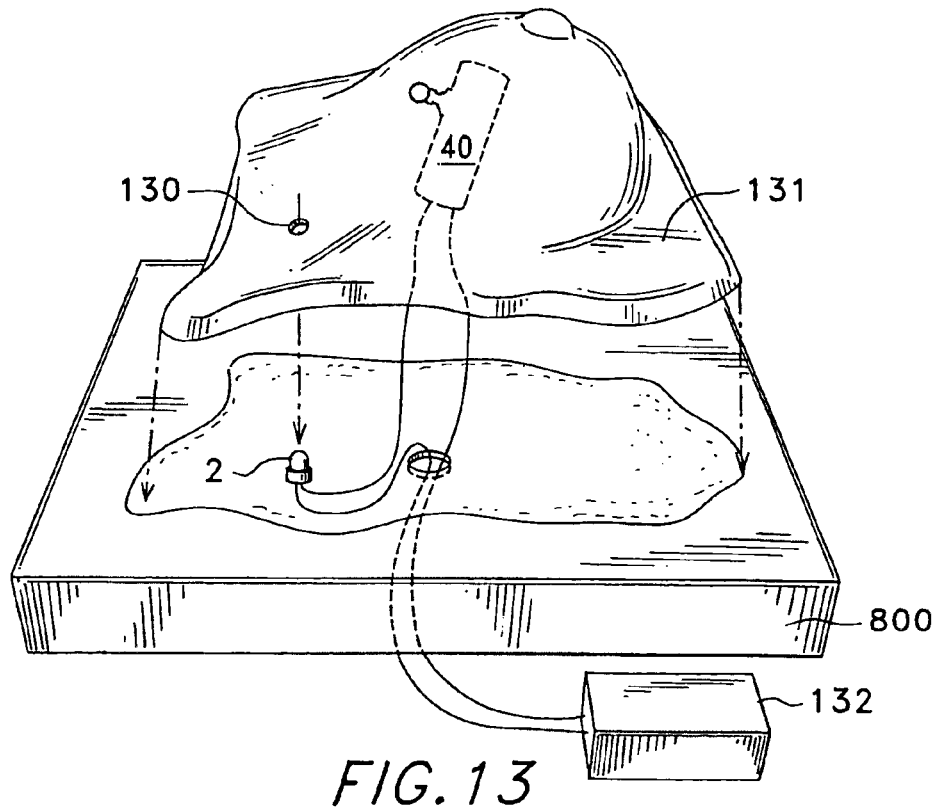
FIG. 13 is an exploded view of a base of the model receiving the silicone breast.
Figure 14:
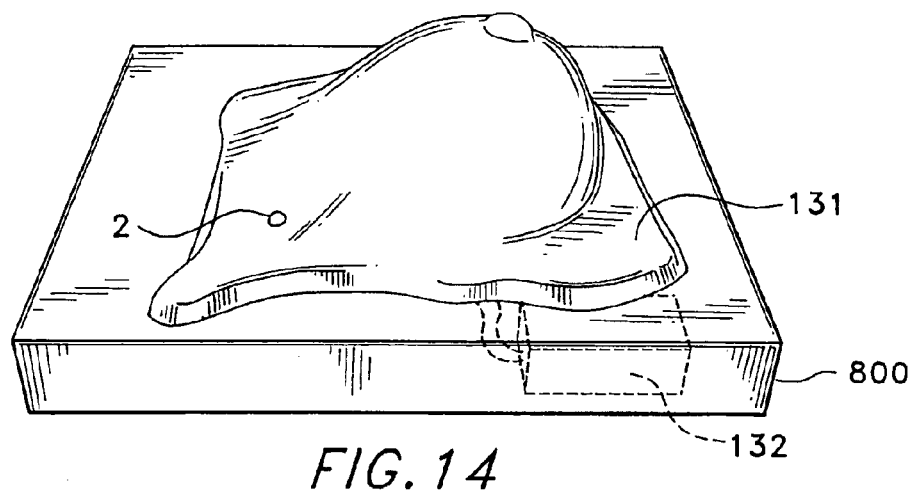
FIG. 14 is a top perspective view of the completed model of FIG. 13.

The insert 40 consists of a silicone body having a cylindrical shape with wires 8,9 extending from an end and the assembly 64 extending from a side. This insert 40 can be placed in any orientation desired in a model of a human breast. Multiple inserts 40 can also be used in the human breast model as shown in FIG. 12.

Figure 5:
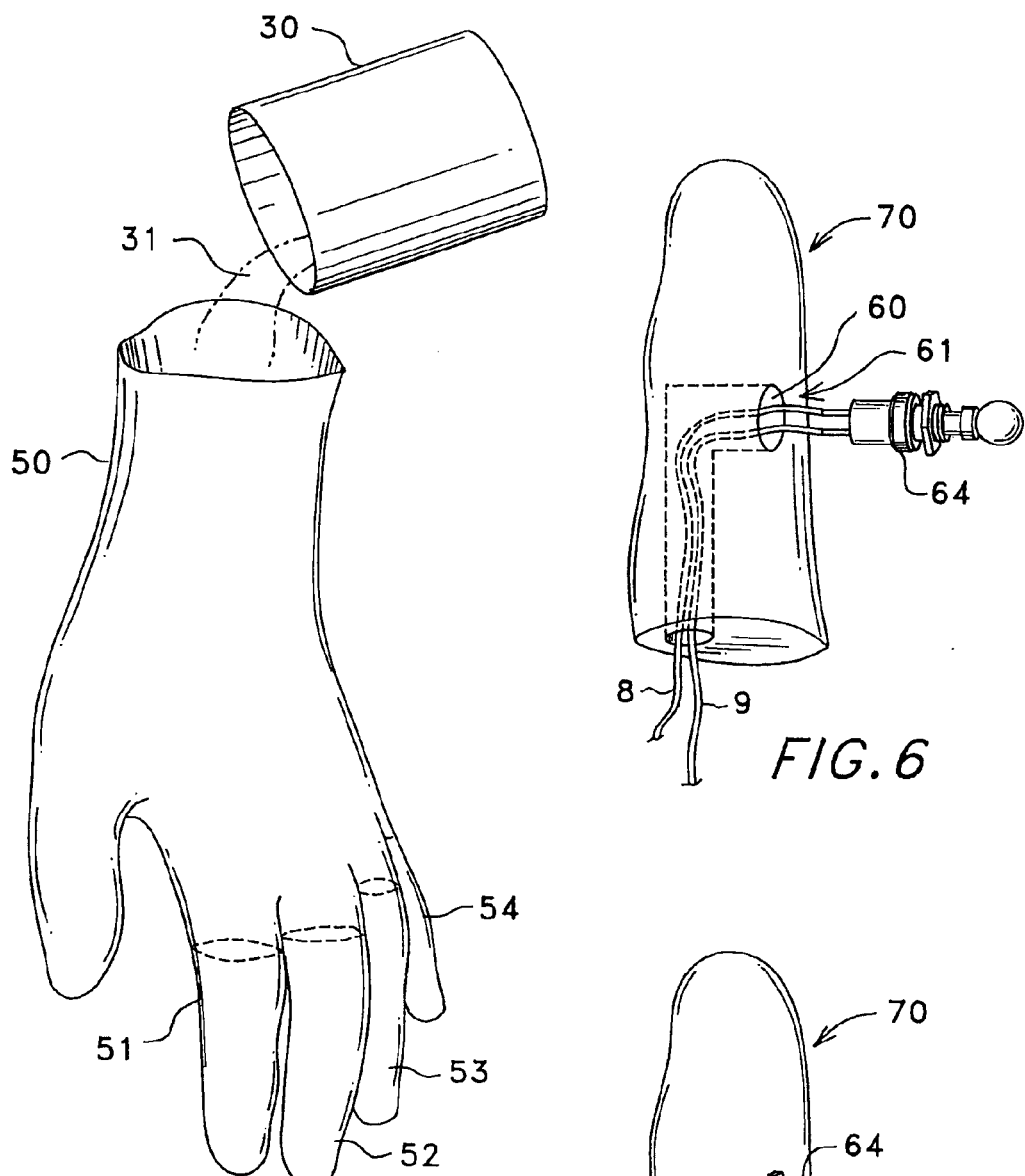
FIGS. 5,6 show the use of a rubber glove as the mold for the silicone lump implant, wherein a tube is shown in dots to provide a channel for the microswitch and wires.
Figure 6:
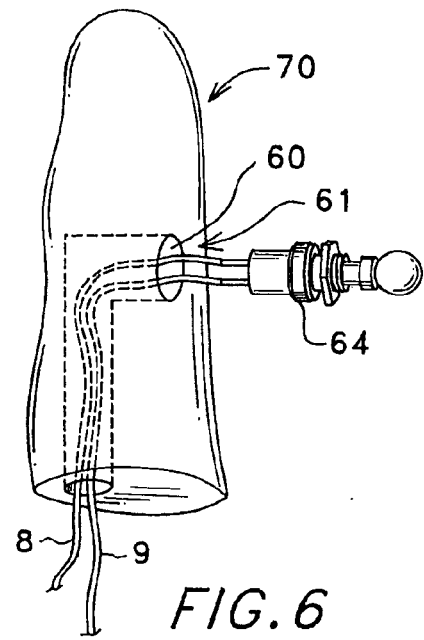
Figure 7:
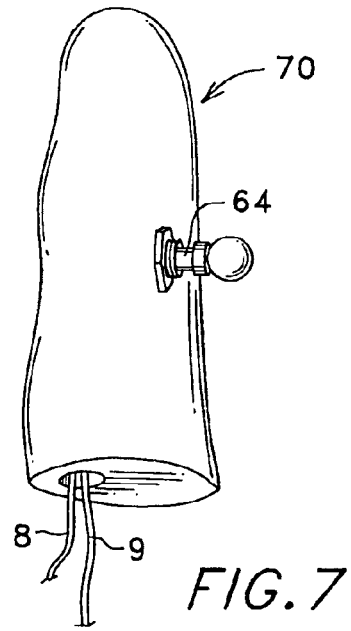
FIG. 7 is a side perspective view of a completed silicone lump implant made from the method taught in FIGS. 5,6.

FIGS. 5,6,7 show an alternative method of forming a similar insert 70. A rubber glove 50 has fingers 51,52,53,54 that are used as molds for the insert 70. A hole 61 is drilled into the finished mold to allow the wires 8,9 to be inserted as shown. Thus, the methods disclosed herein allow anyone to create their own model all over the world to promote early breast cancer detection.

Figure 8:
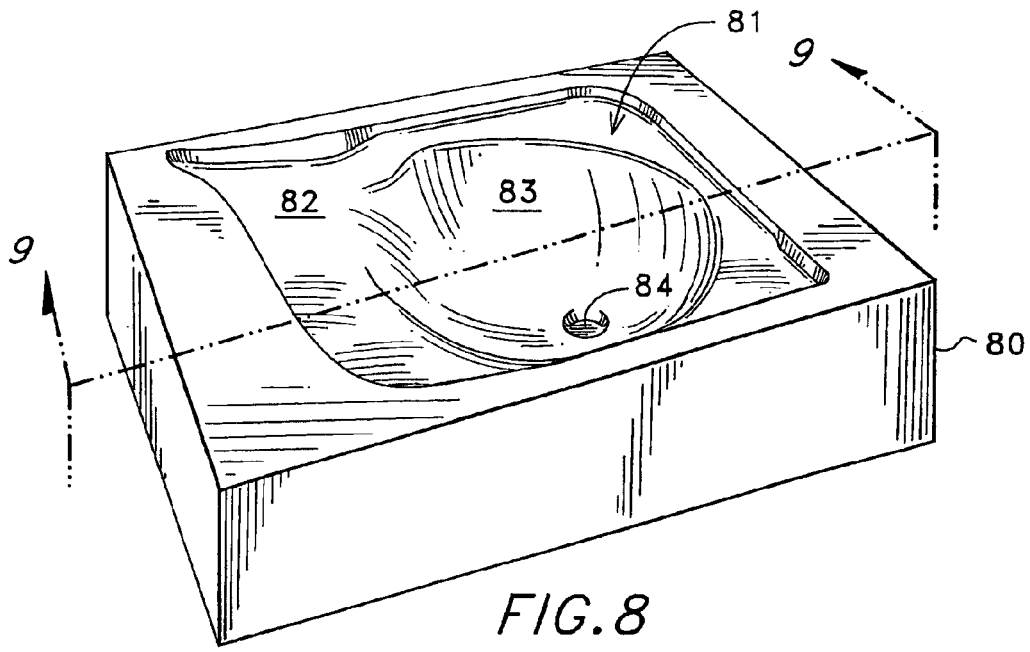
FIG. 8 is a top perspective view of a mold for a human breast model.
Figure 9:
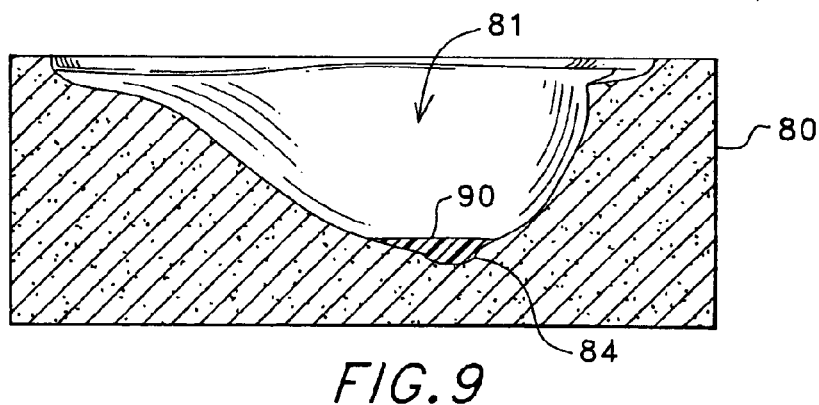
FIG. 9 is a cross sectional view of the model shown in FIG. 8 taken along line 4–9 showing a first pouring of the nipple material into the mold.
Figure 10:
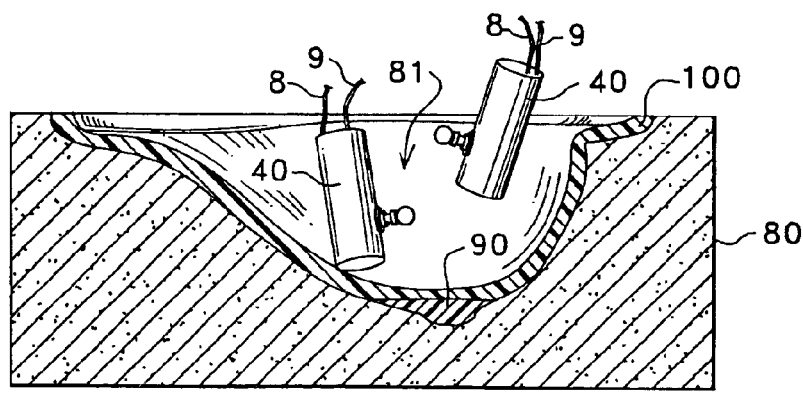
FIG. 10 is the same view as FIG. 9 showing the already poured outside latex skin for the model plus two silicone lump implants positioned for their permanent placement in the model.
Figure 11:
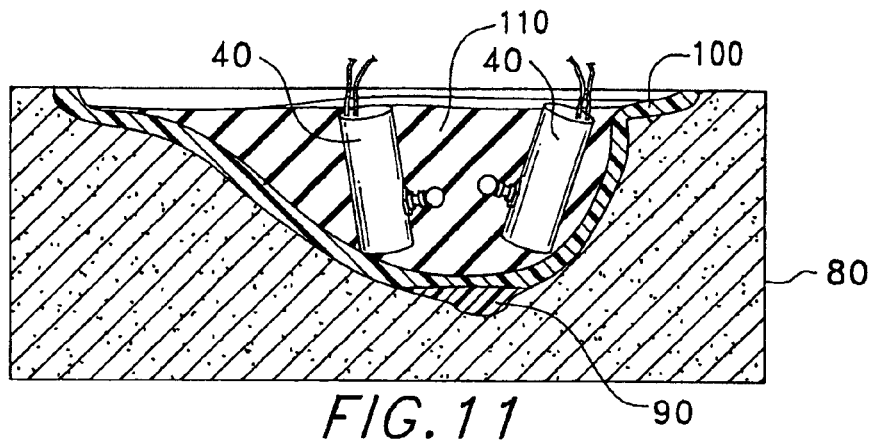
FIG. 11 is the same view as FIG. 10 showing the pouring of the silicone filler in the model.

Referring next to FIG. 8 a breast mold 80 has a cavity 81 which has a flat base portion 82, a breast portion 83 and a nipple portion 84.

In FIGS. 9–14 nipple portion 84 has been filled with a nipple colored silicone 90. Then skin layer 100 is poured. Next an insert (s) 40 is placed in the cavity 81. Next the silicone 110 is poured. Finally base layer 120 is poured. The wires are connected in FIG. 13 to a battery 132 and bulb 2. A hole 130 in the completed model 131 allows the bulb 2 to protrude. A base 800 supports the model 131 and the battery 132 and any other optional training aids such as a voice chip/recorder/speaker.

Figure 19:
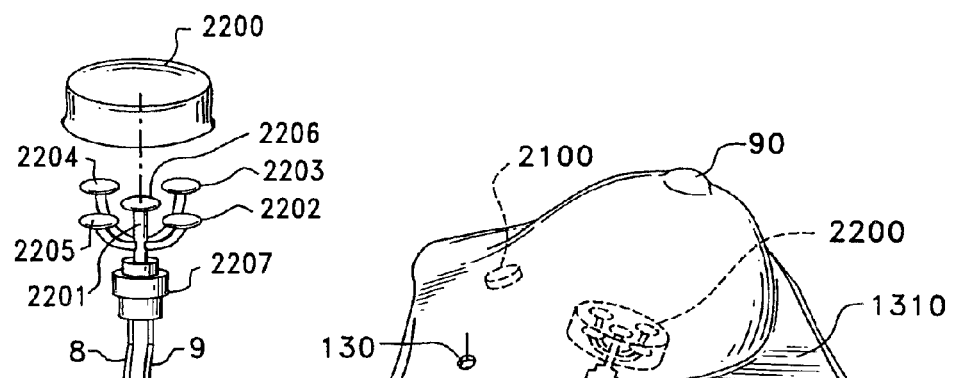
FIG. 19 is an exploded view of an inflamed lymph node model.

An uncured silicone mixed with an oil to give a more lifelike texture than a catalyst is added for curing the silicone 110. A small amount 90 has been set aside and a different color is added. This is poured carefully into the mold area of the nipple and areola giving a different color. The silicone 90 is allowed to set then the rest of the silicone 110 is poured in a circular manner into the mold forming the skin layer 100. Inserts 40 with a substance that is harder than the surrounding silicone attached to it 110 are placed in the cavity 81, then the silicone is poured. The switch 4 has two wires 8, 9 attached. FIG. 1 and FIG. 19 show the microswitches that could be used in the model. FIG. 1 has one point of contact whereas FIG. 19 has 5 points of contact. FIG. 1 simulates location of a lump while FIG. 19 illustrates simulation of finding a swollen lymph node. A lump encompasses a smaller surface area then the surface area of a swollen lymph node. One wire goes to the light and the other to an energy source (battery). The light, a blue LED, is illuminated with pressure applied to the switch (completes a circuit). This can be replaced with a vibrator that would be placed in the silicone and produce waves throughout the silicone. The light could also be replaced with a buzzer or a lever, that would make a buzzing or clicking noise with pressure to the switch and the circuit is completed. The switch could be attached to a tape recorder that would tell you that you found a lump in the breast and if other lumps are to be found. Different types of sensors could be placed in the model before pouring silicone so different amounts of pressure would light different colored lights. The amount of pressure depends on placement of sensors and distance from the surface. To show the amount of pressure needed to detect a lump, a tape recording could also be used that would tell you if more or less pressure is needed. These sensory switches would be placed in areas that have high incidence of cancer or lower incidences than the light or a record would tell if you are in the correct place or not. This will allow for more effective detection not only for the model but to carry into testing of self awareness.

Silicone can be different colors to represent areas of the breast that are the most common places cancer is found. Silicone could be colorless to allow the internal parts of the breast model to be seen as well as locations of lumps. Each internal part of the breast could be a different color with muscles at the back of the breast poured at different times as well as in different directions allowing for an anatomically correct model. The top half of the breast model could be clear silicone. The bottom half could be colored to give an idea of the location of internal parts in relation to the outside of the breast. Silicone could be of different grades and cured at different temperatures or with different catalyst added to change the texture of the silicone. Each internal part would have to have a separate mold. Then these parts would be placed inside the breast model with clear silicone poured into the mold to fill and keep the internal parts in place. The internal part might not need to be made of silicone but other materials. Different sizes of breast for different stages of life (ages) as well as shapes could be made. Lumps of silicone might be added to show swelling in different areas of the breast. These would need to be placed next to the outside of the mold. Then they would have a layer of silicone poured over the lump showing what a lump might look like or feel like. Silicone acting as the outer skin can have color to look like skin cancer, red with black or a dark center, irregular edges (pinpoint, zit like). The mold itself may need to be made differently. It may need to have the pigment added to these areas before the silicone is poured. The nipple may have to be hollowed out so that it could be inverted and then extended as a normal nipple would be. This may need a latex product inside the silicone nipple to allow flexibility so it could be inverted and extended a number of times, so that it wouldn't wear out.

The nipple could have micro holes put into it to allow a fluid to escape with a light squeeze and or palpitation of the nipple and areola. A sack of fluid would be placed behind the nipple. An extended sack with a duct that would lead to the nipple so that with pressure, a small amount of fluid would be produced at the end of the nipple. The fluid would be a white, cloudy substance. This could be replenished with a needle and syringe. The sack would be self sealing with a back flow preventor to the nipple so fluid would flow in only one direction. When cancer has advanced to a stage it will give off an odor. This might be reproduced by a sack into the back of the breast that can be refilled by a needle and syringe. This would be a self sealing sack the odor would only be emitted with palpitation of the swollen area. This method would give reinforcement on how to check and what to check for in the breast.

Lymphatic systems, different than lumps used for cancer not as density and not fluid as fibrous cyst. These would be placed in muscle level of the breast, pectoralis major and minor at approximately the location where they would normally be found. Apical lymph nodes, central lymph nodes, anterior axillary or pectoral lymph nodes and internal thoracic lymph nodes are to be placed at each site. Two normal nodes and two enlarged nodes could be placed in the breast model. The normal node could be attached to one colored light while the enlarged node could be attached to a different colored light so that a comparison could be made. These also change in size and density with age.

Along with these models, a DVD or VHS with a 3–5 minute long message describing the procedure of breast self-examination would be given so that a person can practice along with the tape, the pat and rub or the spoke method.

Figure 15:
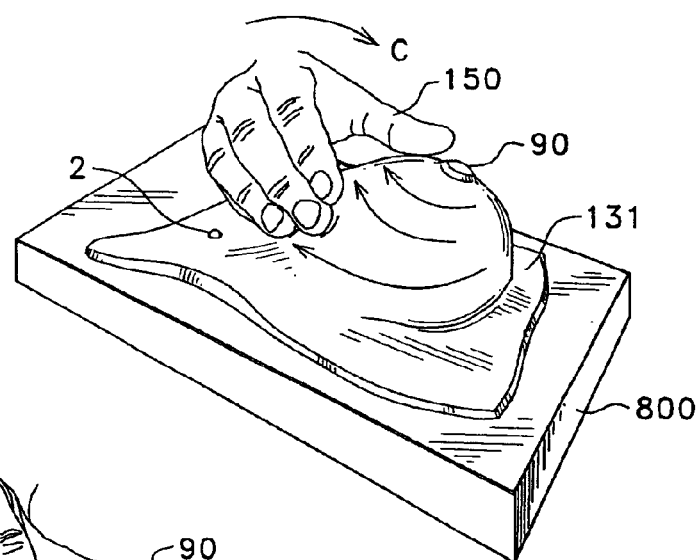
FIG. 15 is a top perspective view of a student practicing the three finger pat and rub technique.
Figure 17:
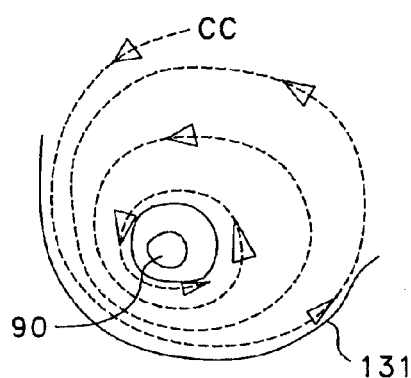
FIG. 17 is a schematic diagram of the pat and rub technique.

In FIGS. 15, 17, the student 150 is using the pat and rub technique using three middle fingers to apply pressure. Pat and rub in a circular motion moving completely around the breast in one direction c (clockwise) or cc (counterclockwise) direction starting from the stem (outer breast) to the nipple 90.

Figure 16:
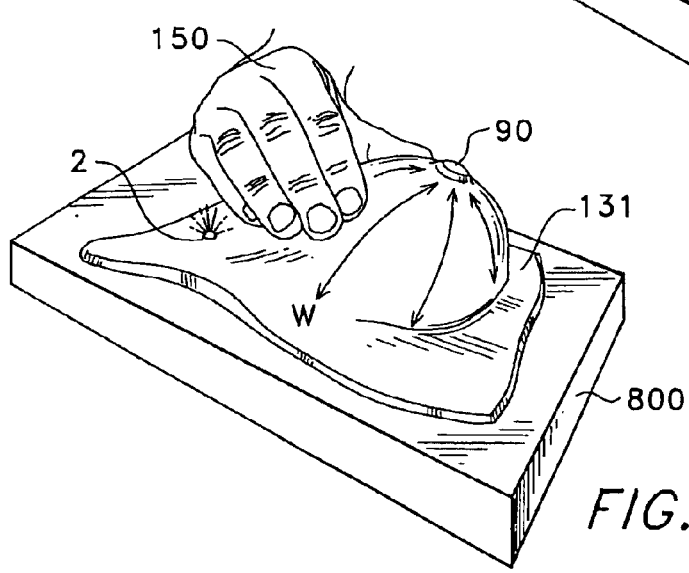
FIG. 16 is the same view as FIG. 15 showing the student using the spoke wheel technique.
Figure 18:
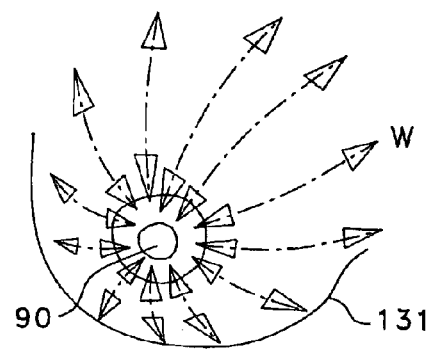
FIG. 18 is a schematic diagram of the spoke wheel technique.

In FIGS. 16, 18 the spoke wheel technique is used with the three middle fingers applying pressure in a straight line (arrows w) from the stem to the nipple 90. Fingers are moved until the entire breast has been examined. The movements of the fingers look like the spokes of a wheel.

Lymph nodes typically enlarge when a women has breast cancer. Lymph nodes are different from breast cancer tumor. The lymphatic system forms lumps that are not as dense or fluid as a fibrous cyst. In the model, lymph nodes would be placed in the muscle level of the breast, pectoralis major and minor, at approximately the location where they would normally be found. Apical lymph nodes, central lymph nodes, anterior axillary lymph nodes or pectoral lymph nodes and internal thoracic lymph nodes may be placed at each site. Two normal nodes and two enlarged nodes could be placed in a breast model. The normal node could be attached to one colored light while the enlarged node could be attached to a different colored light so that a comparison could be made. The lymph nodes also typically change in size and density with age.

The artificial lumps may be made from wood, rubber, plastic, metal or virtually any hard material. Generally the diameter of the spherical lump ranges from 0.5 cm. to 3 millimeters. Non-spherical lumps such as to simulate a fibrous lump could also be used. Switches such as a wall mounted rheostat, but with a linear actuator could be used to teach a student a proper pressure level for his palpitations.

Figure 20:
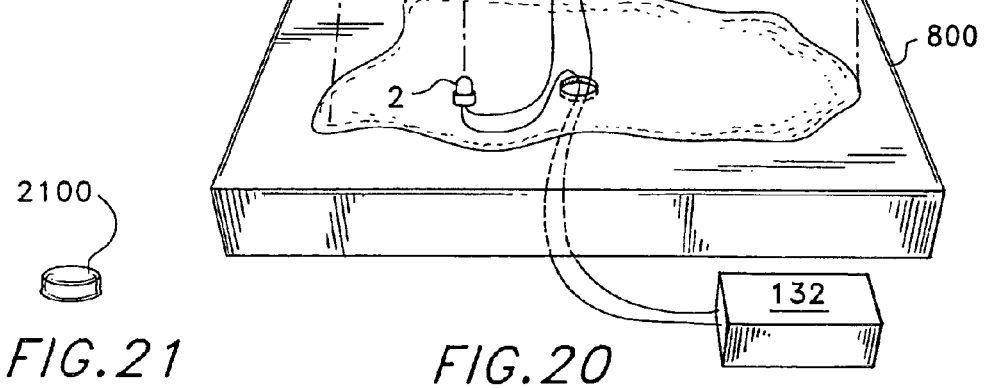
FIG. 20 is an exploded view of a model with an inflamed lymph node switch and a normal lymph node without a switch in the model.
Figure 21:
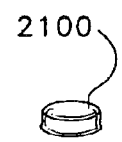
FIG. 21 is a top perspective view of a simulated normal lymph node.

Referring next to FIGS. 19, 20, 21 a lymph node training breast 1310 has installed therein a normal simulated lymph node lump 2100, and a larger inflamed simulated lymph node 2200. Each are preferably made of a harder plastic like the nipple 90. The toggle switch 2207 has an armature 2201 with a top 2206. The simulated lymph node 2200 is connected to the top 2206 as well as to arms 2202, 2203, 2204, 2205. The student can activate the light by depressing any of the items 2206, 2202, 2203, 2204, 2205.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A teaching aid comprising:
   a soft model of a human breast;
   an imitation lump mounted inside the model;
   an electric switch connected to the imitation lump; and
   wherein a movement of the imitation lump changes a condition of the switch to activate an alarm device.

2. The apparatus of claim 1 further comprising an insert of the pliable material housing the electric switch, wherein the imitation lump protrudes therefrom, and the insert is mountable in the model of the human breast at a desired orientation.

3. The apparatus of claim 2, wherein the electric switch further comprises a plunger activator, and the imitation lump is a solid mass attached to the plunger activator.

4. The apparatus of claim 3, wherein the alarm device further comprises a light.

5. The apparatus of claim 4 further comprising a base that supports the model, the light and a battery.

6. The apparatus of claim 5, wherein the alarm device further comprises a voice storage device with a speaker.

7. The apparatus of claim 2 further comprising a plurality of inserts.

8. The apparatus of claim 2, wherein the model further comprises a nipple segment, a skin segment and an interior segment.

9. Training aid comprising:
   a base having a battery and an alarm device mounted therein;

a soft, pliable model of a human breast mounted on the base;

said model having an insert inside which is mounted at a chosen orientation;

wherein the insert has a solid mass protruding therefrom which triggers an electric switch in the insert when the solid mass is pushed; and wherein the electric switch activates the alarm device.

10. The apparatus of claim 9, wherein the electric switch has plunger, and the solid mass further comprises a sphere chosen to have a specific diameter to simulate a cancerous lump, said sphere attached to the plunger.

11. The apparatus of claim 9, wherein the alarm device is light.

12. The apparatus of claim 9, wherein the model further comprises a nipple segment, a skin segment and an interior segment.

13. The apparatus of claim 12, wherein the model is made of silicone.

14. A method to form a training aid, the method comprising the steps of:

imbedding a microswitch in an insert;

placing a simulated cancerous lump on action end of the micro switch;

forming a mold of a human breast;

pouring a nipple colored silicone into the mold;

pouring a skin colored silicone into the entire periphery of the mold;

positioning said insert to a chosen orientation for training to find the simulated lump;

pouring the interior of the mold; and wiring the microswitch to a power supply and an alarm device, so that pushing the lump activates the alarm device.

\* \* \* \* \*